(12) United States Patent
Galasso

(10) Patent No.: US 9,103,549 B2
(45) Date of Patent: Aug. 11, 2015

(54) DUAL STREAM SYSTEM AND METHOD FOR PRODUCING CARBON DIOXIDE

(71) Applicant: The Boeing Company, Chicago, IL (US)

(72) Inventor: D. Anthony Galasso, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 13/767,083

(22) Filed: Feb. 14, 2013

(65) Prior Publication Data

US 2014/0053761 A1 Feb. 27, 2014

Related U.S. Application Data

(60) Provisional application No. 61/692,604, filed on Aug. 23, 2012.

(51) Int. Cl.
*F23J 15/02* (2006.01)
*B01D 53/62* (2006.01)
*B01D 53/75* (2006.01)
(Continued)

(52) U.S. Cl.
CPC .................. *F23J 15/02* (2013.01); *B01D 53/62* (2013.01); *B01D 53/75* (2013.01); *C01B 31/20* (2013.01); *B01D 53/04* (2013.01); *B01D 53/1475* (2013.01); *B01D 2253/108* (2013.01); *B01D 2256/22* (2013.01); *B01D 2257/504* (2013.01); *B01D 2258/018* (2013.01); *B01D 2258/0283* (2013.01); *Y02C 10/04* (2013.01);
(Continued)

(58) Field of Classification Search
CPC ..................... B01D 2253/108; B01D 2256/22; B01D 2257/504; B01D 2258/018; B01D 2258/0283; B01D 53/04; B01D 53/1475; B01D 53/62; B01D 53/75; C01B 31/20; F23J 15/02; Y02C 10/04; Y02C 10/06; Y02C 10/08; Y02E 20/12
See application file for complete search history.

(56) References Cited

U.S. PATENT DOCUMENTS 3,493,339 A * 2/1970 Wheldon et al. .............. 423/262
3,660,967 A * 5/1972 Collins et al. ................... 95/137
(Continued)

FOREIGN PATENT DOCUMENTS

DE 4003533 2/1990
DE 4003533 A1 8/1990
(Continued)

OTHER PUBLICATIONS

Extended European Search Report issued in EP12180636.8 (Dec. 14, 2012).
(Continued)

*Primary Examiner* — Christopher P Jones
(74) *Attorney, Agent, or Firm* — Walters & Wasylyna LLP

(57) ABSTRACT

A system for producing carbon dioxide from a process gas that includes a hydrocarbon, the system including a combustion subsystem configured to combust the hydrocarbon and output a combustion effluent, wherein the combustion effluent includes carbon dioxide and water, a first separation subsystem configured to separate a first quantity of carbon dioxide from the combustion effluent, and a second separation subsystem configured to separate a second quantity of carbon dioxide from the combustion effluent.

20 Claims, 3 Drawing Sheets

(51) Int. Cl.
    *C01B 31/20* (2006.01)
    *B01D 53/04* (2006.01)
    *B01D 53/14* (2006.01)

(52) U.S. Cl.
    CPC ............... *Y02C 10/06* (2013.01); *Y02C 10/08* (2013.01); *Y02E 20/12* (2013.01)

(56) References Cited

U.S. PATENT DOCUMENTS

| | | | |
|---|---|---|---|
| 4,249,915 A | | 2/1981 | Sircar et al. |
| 4,726,815 A | | 2/1988 | Hashimoto et al. |
| 4,784,672 A | | 11/1988 | Sircar |
| 4,797,141 A | * | 1/1989 | Mercader et al. ............... 62/635 |
| 5,059,405 A | | 10/1991 | Watson et al. |
| 5,100,635 A | * | 3/1992 | Krishnamurthy et al. .... 423/235 |
| 5,232,474 A | * | 8/1993 | Jain .................................. 95/97 |
| 5,233,837 A | * | 8/1993 | Callahan ........................ 62/621 |
| 6,027,548 A | * | 2/2000 | Ackley et al. ..................... 95/96 |
| 6,712,879 B2 | * | 3/2004 | Kato et al. ...................... 95/139 |
| 7,947,120 B2 | | 5/2011 | Deckman et al. |
| 2009/0232861 A1 | * | 9/2009 | Wright et al. ................. 424/405 |
| 2009/0294366 A1 | * | 12/2009 | Wright et al. ................. 210/683 |
| 2010/0251937 A1 | * | 10/2010 | Murray et al. ................. 106/705 |
| 2011/0189075 A1 | * | 8/2011 | Wright et al. ............. 423/437.1 |
| 2011/0247491 A1 | | 10/2011 | Leitgeb et al. |
| 2011/0296872 A1 | * | 12/2011 | Eisenberger ................... 62/640 |
| 2012/0204720 A1 | * | 8/2012 | Tschantz et al. ................ 95/148 |
| 2013/0047664 A1 | | 2/2013 | DiCenzo |
| 2013/0174739 A1 | * | 7/2013 | Dvininov et al. ............... 96/146 |

FOREIGN PATENT DOCUMENTS

| | | |
|---|---|---|
| GB | 2171927 | 9/1986 |
| WO | 2012/013596 | 2/2012 |

OTHER PUBLICATIONS

Amato et al., "Methane Oxycombustion for Low $CO_2$ Cycles: Blowoff Measurements and Analysis," *Journal of Engineering for Gas Turbines and Power*, vol. 133 (Jun. 2011).

Smardzewski et al., "A Laboratory Study of the Dielectric Heating of Molecular Sieve Material," *Naval Research Laboratory*, (May 27, 1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChE Journal*, vol. 53, No. 12 (2007).

Cavenati et al., "Adsorption Equilibrium of Methane, Carbon Dioxide, and Nitrogen on Zeolite 13X at High Pressures," Journal of Chemical Engineering Data, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

Extended European Search Report, App. No. EP 13 18 0913 (2013).

\* cited by examiner

DUAL STREAM SYSTEM AND METHOD FOR PRODUCING CARBON DIOXIDE

PRIORITY

This application claims priority from U.S. Ser. No. 61/692,604 filed on Aug. 23, 2012.

FIELD

This application relates to carbon dioxide production and, more particularly, to semi-mobile, on-site carbon dioxide production.

BACKGROUND

A significant amount of carbon dioxide is used in enhanced oil recovery ("EOR"). An oil well typically collects approximately 30 percent of its oil from an underground oil reservoir during the primary recovery phase. An additional 20 percent of the oil may be recovered using secondary recovery techniques, such as water flooding that raises the underground pressure. The EOR process provides a tertiary recovery technique capable of recovering an additional 20 percent or more of the oil from the underground reservoir.

During the EOR process, large quantities of carbon dioxide are injected into the underground oil reservoir, thereby urging additional oil from the well. Carbon dioxide is a preferred EOR gas due to its ability to mix with the underground oil and render the oil less viscous and more readily extractable.

The carbon dioxide used in EOR processes may be obtained from various sources using various techniques. For example, carbon dioxide may be collected from natural sources, such as ambient air, or may be collected as a byproduct of various industrial purposes, such as beer fermentation. Unfortunately, traditional carbon dioxide production techniques are energy intensive, particularly when run on an industrial scale. Furthermore, the cost of transporting carbon dioxide from the production site to the EOR site (e.g., by freight or pipeline) is quite significant.

Accordingly, those skilled in the art continue with research and development efforts in the field of carbon dioxide production and delivery.

SUMMARY

In a first embodiment, the disclosed dual stream system for producing carbon dioxide from a process gas that includes a hydrocarbon may include (1) a combustion subsystem configured to combust the hydrocarbon and output a combustion effluent, wherein the combustion effluent includes carbon dioxide and water, (2) a first separation subsystem configured to separate a first quantity of carbon dioxide from the combustion effluent, and (3) a second separation subsystem configured to separate a second quantity of carbon dioxide from the combustion effluent.

In one variation of the first embodiment, the hydrocarbon includes at least one of methane, ethane, propane, and butane.

In another variation of the first embodiment, the hydrocarbon may be methane.

In another variation of the first embodiment, the process gas may be natural gas.

In another variation of the first embodiment, the process gas may further include carbon dioxide.

In another variation of the first embodiment, the combustion subsystem may include an internal combustion engine.

In another variation of the first embodiment, the combustion subsystem may include a diesel engine modified to run on the hydrocarbon.

In another variation of the first embodiment, the combustion subsystem may include a turbine.

In another variation of the first embodiment, the combustion subsystem may be configured to mix ambient air with the hydrocarbon.

In another variation of the first embodiment, the combustion effluent may further include nitrogen.

In another variation of the first embodiment, the combustion effluent may further include oxygen.

In another variation of the first embodiment, the combustion effluent may include at least about 5 percent by weight of the carbon dioxide.

In another variation of the first embodiment, the combustion effluent may include at least about 10 percent by weight of the carbon dioxide.

In another variation of the first embodiment, the combustion effluent may include at least about 12 percent by weight of the carbon dioxide.

In another variation of the first embodiment, the combustion effluent may be substantially free of the hydrocarbon.

In another variation of the first embodiment, the combustion subsystem may generate electrical energy.

In another variation of the first embodiment, the combustion subsystem may generate electrical energy and the electrical energy may be supplied to the first separation subsystem and/or the second separation subsystem.

In another variation of the first embodiment, a cooling subsystem may be interposed between the combustion subsystem and the first separation subsystem.

In another variation of the first embodiment, a cooling subsystem may be interposed between the combustion subsystem and the first separation subsystem, and the cooling subsystem may include a heat exchanger.

In another variation of the first embodiment, a cooling subsystem may be interposed between the combustion subsystem and the first separation subsystem, and the cooling subsystem may include a heat exchanger, wherein the heat exchanger is thermally coupled with the first separation subsystem and/or the second separation subsystem.

In another variation of the first embodiment, a cooling subsystem may be interposed between the combustion subsystem and the first separation subsystem, wherein the cooling subsystem includes a desiccant.

In another variation of the first embodiment, the first separation subsystem may include an adsorbent material.

In another variation of the first embodiment, the first separation subsystem may include an adsorbent material, wherein the adsorbent material includes a zeolite.

In another variation of the first embodiment, the second separation subsystem may include a chemical sorbent.

In another variation of the first embodiment, the second separation subsystem may include a chemical sorbent, wherein the chemical sorbent includes an amine.

In another variation of the first embodiment, the second separation subsystem may include a chemical sorbent, wherein the chemical sorbent includes an alkanolamine.

In another variation of the first embodiment, the second separation subsystem may include a chemical sorbent, wherein the chemical sorbent includes a member selected from the group consisting of monoethanolamine, diethanolamine, methyldiethanolamine, diisopropanolamine, diglycolamine, triethanolamine, and combinations thereof.

In another variation of the first embodiment, the second separation subsystem may be in series with the first separation subsystem and downstream of the first separation subsystem.

In another variation of the first embodiment, the second separation subsystem may be in series with the first separation subsystem and downstream of the first separation subsystem, and wherein an air moving unit is configured to introduce ambient air to the combustion effluent.

In another variation of the first embodiment, the second separation subsystem may be in series with the first separation subsystem and downstream of the first separation subsystem, and wherein an air moving unit is configured to introduce ambient air to the combustion effluent, the ambient air being introduced between the first separation subsystem and the second separation subsystem.

In yet another variation of the first embodiment, the combustion subsystem, the first separation subsystem and the second separation subsystem may be on a mobile platform.

In a second embodiment, the disclosed dual stream system for producing carbon dioxide from a process gas that includes a hydrocarbon may include (1) a combustion subsystem configured to combust the hydrocarbon and output a combustion effluent, wherein the combustion effluent includes carbon dioxide and water, (2) a first separation subsystem configured to separate a first quantity of carbon dioxide from the combustion effluent by physisorption, and (3) a second separation subsystem in series with the first separation subsystem, the second separation subsystem being configured to separate a second quantity of carbon dioxide from the combustion effluent by chemisorption.

In a third embodiment, the disclosed dual stream method for producing carbon dioxide may include the steps of (1) providing a process gas including a hydrocarbon, (2) combusting the hydrocarbon to generate electrical energy and a combustion effluent, wherein the combustion effluent includes carbon dioxide and water, (3) separating a first quantity of carbon dioxide from the combustion effluent, and (4) separating a second quantity of carbon dioxide from the combustion effluent.

In one variation of the third embodiment, the hydrocarbon may include at least one of methane, ethane, propane and butane.

In another variation of the third embodiment, the hydrocarbon is methane.

In another variation of the third embodiment, the process gas is natural gas.

In another variation of the third embodiment, the process gas further includes carbon dioxide.

In another variation of the third embodiment, the method further includes the step of mixing ambient air with the hydrocarbon prior to the combusting step.

In another variation of the third embodiment, the combustion effluent is substantially free of the hydrocarbon.

In another variation of the third embodiment, the method further includes the step of separating the water from the combustion effluent.

In another variation of the third embodiment, the method further includes the step of cooling the combustion effluent.

In another variation of the third embodiment, the method further includes the step of cooling the combustion effluent, wherein the cooling step is performed prior to separating the first and the second quantities of carbon dioxide.

In another variation of the third embodiment, the electrical energy is used during the step of separating the first quantity and/or the step of separating the second quantity.

In another variation of the third embodiment, the step of separating the first quantity includes contacting the combustion effluent with an adsorbent material.

In another variation of the third embodiment, the step of separating the first quantity includes contacting the combustion effluent with an adsorbent material, wherein the adsorbent material includes a zeolite.

In another variation of the third embodiment, the step of separating the second quantity includes contacting the combustion effluent with a chemical sorbent.

In another variation of the third embodiment, the step of separating the second quantity includes contacting the combustion effluent with a chemical sorbent, wherein the chemical sorbent includes an amine.

In another variation of the third embodiment, the step of separating the second quantity includes contacting the combustion effluent with a chemical sorbent, wherein the chemical sorbent includes an alkanolamine.

In another variation of the third embodiment, the step of separating the second quantity includes contacting the combustion effluent with a chemical sorbent, wherein the chemical sorbent includes a member selected from the group consisting of monoethanolamine, diethanolamine, methyldiethanolamine, diisopropanolamine, diglycolamine, triethanolamine, and combinations thereof.

In a fourth embodiment, the disclosed dual stream method for producing carbon dioxide may include the steps of (1) providing a process gas including a hydrocarbon, (2) combusting the hydrocarbon to generate electrical energy and a combustion effluent, wherein the combustion effluent includes carbon dioxide and water, (3) separating a first quantity of carbon dioxide from the combustion effluent using a physical adsorbent material, and (4) separating a second quantity of carbon dioxide from the combustion effluent using a chemical sorbent.

Other embodiments of the disclosed dual stream system and method for producing carbon dioxide will become apparent from the following detailed description, the accompanying drawings and the appended claims.

DETAILED DESCRIPTION

Figure 1:
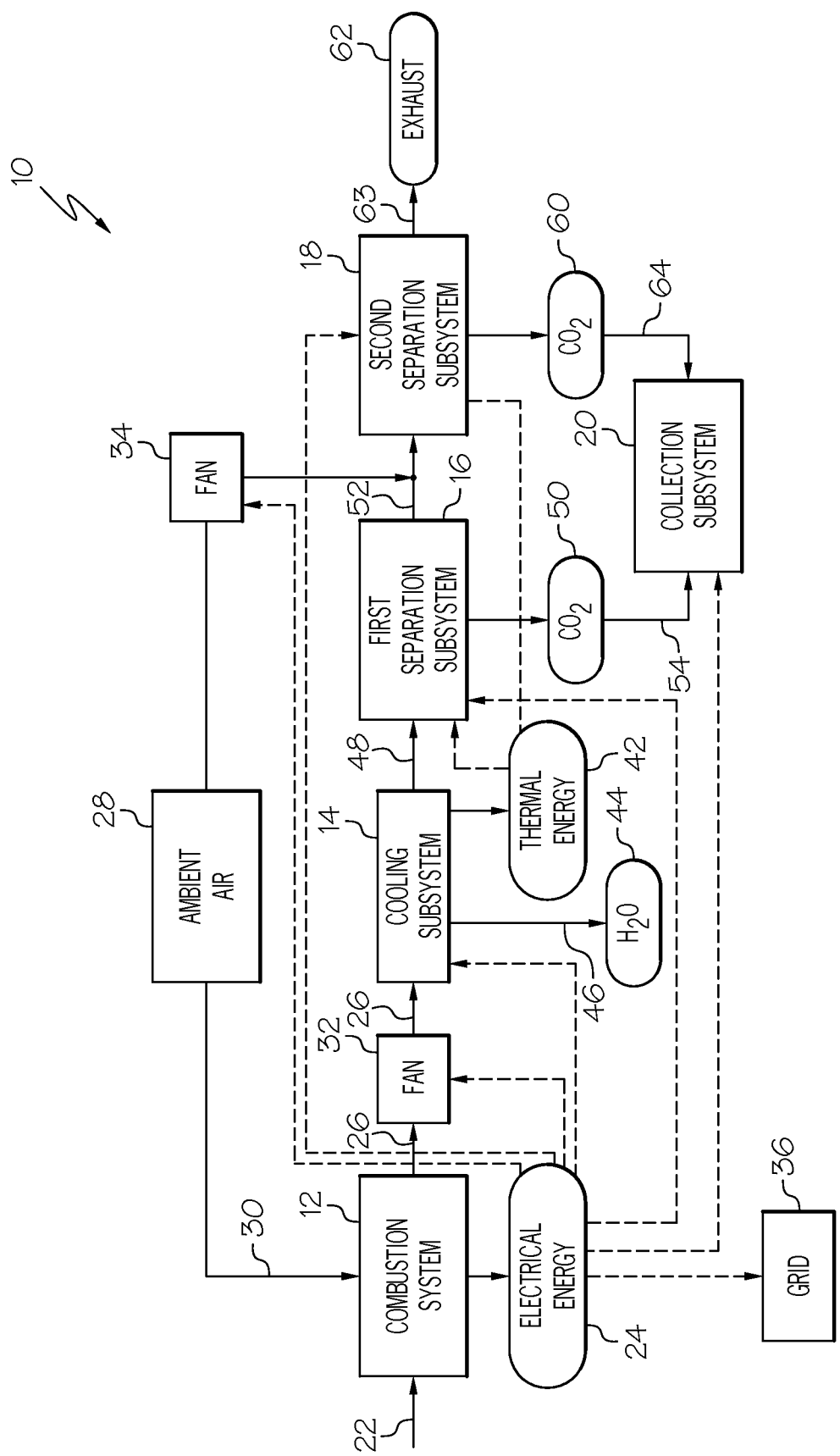
FIG. 1 is a schematic process flow diagram of one embodiment of the disclosed dual stream system for producing carbon dioxide.

Referring to FIG. 1, one embodiment of the disclosed dual stream system for producing carbon dioxide, generally designated 10, may include a combustion subsystem 12, a cooling subsystem 14, a first separation subsystem 16, and a second separation subsystem 18. A collection subsystem 20 may be provided to collect the dual carbon dioxide streams produced by the system 10. Additional components and subsystems may be incorporated into the disclosed system 10 without departing from the scope of the present disclosure.

A process gas 22 may be supplied to the system 10 at the combustion subsystem 12. The process gas 22 may be any gas or gaseous mixture that includes a hydrocarbon, such as methane ($CH_4$), ethane ($C_2H_6$), propane ($C_3H_8$) and/or butane ($C_4H_{10}$). In addition to the hydrocarbon, the process gas 22 may include other constituents, such as carbon dioxide, water vapor, nitrogen and/or hydrogen sulfide. The concentration of the hydrocarbon component of the process gas 22 may vary depending on the source of the process gas 22.

In one particular implementation, the process gas 22 may be natural gas, which may include a significant methane component. The natural gas may be sourced from a natural gas field, an oil field (e.g., an enhanced oil recovery site), a coal mine or the like. The natural gas may be supplied to the system 10 by a local, on-site well, or by other means, such as a pipeline or storage container.

While the disclosed system 10 may be advantageous implemented at various locations associated with the petroleum industry (e.g., gas fields and EOR sites), various other sources of the process gas 22 may be used without departing from the scope of the present disclosure. As one example, the process gas 22 may be sourced from an agricultural facility (e.g., a dairy farm having a methane capture system). As another example, the process gas 22 may be sourced from a landfill (e.g., a landfill having a methane capture system). Other suitable sources of the hydrocarbon-containing process gas 22 will become apparent to those skilled in the art upon reading the present disclosure.

The combustion subsystem 12 may receive the process gas 22 and may combust the hydrocarbon in the process gas 22 (as well as any other combustible constituents in the process gas 22) to generate electrical energy 24 and a gaseous combustion effluent 26. If oxygen is required to sustain (or complete) combustion, ambient air 28 may be collected from the ambient environment and may be supplied to the combustion subsystem 12 by way of fluid line 30 and mixed with the process gas 22 prior to combustion of the hydrocarbon.

The electrical energy 24 generated by the combustion subsystem 12 may be used to power the various components and subsystems of the system 10, such as the cooling subsystem 14, the first separation subsystem 16, the second separation subsystem 18, the collection subsystem 20 and the air moving units 32, 34 (discussed below). Alternatively (or additionally), the electrical energy 24 generated by the combustion subsystem 12 may be sold to the grid 36. Therefore, the electrical energy 24 generated by the combustion subsystem 12 may be one of several income sources of the disclosed system 10.

The combustion subsystem 12 may include any suitable combustion apparatus or system. As one example, the combustion subsystem 12 may include an internal combustion engine with intermittent combustion, such as a diesel engine modified to run on natural gas. As another example, the combustion subsystem 12 may include a continuous combustion engine, such as a turbine (e.g., a microturbine). While a continuous combustion engine may be more efficient at producing electrical energy 24 than an internal combustion engine with intermittent combustion, a less efficient combustion subsystem 12, such as a diesel engine modified to run on natural gas, may generate more carbon dioxide and, therefore, may improve overall system economics.

The combustion subsystem 12 may convert the hydrocarbons in the process gas 22 to carbon dioxide and water. For example, the hydrocarbons in the process gas 22 may be converted to carbon dioxide and water as follows:

  (Eq. 1)

  (Eq. 2)

  (Eq. 3)

  (Eq. 4)

Thus, the combustion effluent 26 may comprise carbon dioxide and water, as well as the constituents of ambient air 28 (e.g., nitrogen, oxygen) that have passed through the combustion subsystem 12 and other combustion byproducts (e.g., carbon monoxide, nitrogen oxides). The combustion effluent 26 may be substantially free of hydrocarbons, which may be substantially completely combusted within the combustion subsystem 12.

As an example, when the process gas 22 is natural gas, the combustion effluent 26 may comprise at least about 10 percent by weight carbon dioxide (e.g., about 12 percent by weight carbon dioxide) and at least 5 percent by weight water (e.g., about 9 percent by weight water). Of course, the actual concentrations of carbon dioxide and water in the combustion effluent 26 will depend on various factors, such as the composition of the process gas 22, the amount (if any) of ambient air 28 fed to the combustion subsystem 12, the humidity of the ambient air 28, and the configuration of the combustion subsystem 12.

The combustion effluent 26 may pass from the combustion subsystem 12 to the cooling subsystem 14, which may cool the combustion effluent 26 prior to the combustion effluent passing to the first separation subsystem 16. An air moving unit 32, such as a fan or blower, may be interposed between the combustion subsystem 12 and the cooling subsystem 14 to facilitate transport of the combustion effluent 26 to the cooling subsystem 14.

Without being limited to any particularly theory, cooling the combustion effluent 26 prior to the combustion effluent passing to the first separation subsystem 16 may be advantageous when the first separation subsystem 16 employs physical adsorption (discussed below) to extract carbon dioxide. Specifically, it may be advantageous to cool the combustion effluent 26 to within a certain temperature (e.g., at least 10 degrees or at least 5 degrees) of the adsorbent material to enhance physical adsorption. For example, when the adsorbent material is at ambient conditions (25° C.), the combustion effluent 26 may be cooled to at most 35° C. (e.g., 30° C.).

Figure 2:
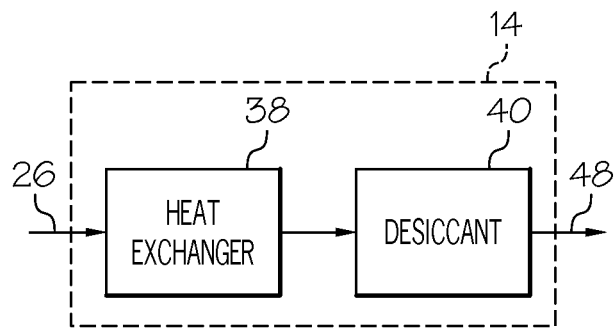
FIG. 2 is a schematic block diagram of the cooling subsystem of the system of FIG. 1.

Referring to FIG. 2, the cooling subsystem 14 may include a heat exchanger 38 and an optional desiccant chamber 40. The cooling subsystem 14 may include additional components, such as additional heat exchangers and/or additional desiccant chambers, without departing from the scope of the present disclosure.

The heat exchanger 38 may remove thermal energy 42 (FIG. 1) from the combustion effluent 26. For example, the heat exchanger 38 may include a counter-circulating cooling fluid (e.g., water or glycol) that extracts thermal energy 42 from the combustion effluent 26. Various heat exchange apparatus and systems may be used without departing from the scope of the present disclosure.

Referring back to FIG. 1, the thermal energy 42 removed from the combustion effluent 26 by the heat exchanger 38 (FIG. 2) at the cooling subsystem 14 may be supplied to one or more of the components and subsystems of the system 10. For example, the thermal energy 42 removed at the heat exchanger 38 may be supplied to the first and second separation subsystems 16, 18, and may be used to regenerate with heat the adsorbent materials (discussed below) contained within the first and second separation subsystems 16, 18. Other uses of the thermal energy 42 are also contemplated.

By cooling the combustion effluent 26, the heat exchanger 38 (FIG. 2) may condense water vapor within the combustion effluent 26, which may then be output as water 44 by way of fluid line 46. The water 44 may be used by the system 10, may be sold (e.g., may be another income stream of the system 10), or may be discharged (e.g., to a drain).

Referring back to FIG. 2, the optional desiccant chamber 40 may remove substantially all of the water vapor remaining in the combustion effluent 26 after condensation in the heat exchanger 38. For example, after the desiccant chamber 40, the water content of the combustion effluent 26 may be 1 percent by weight or less. The water removed from the combustion effluent 26 at the desiccant chamber 40 may be output as water 44 (FIG. 1) by way of fluid line 46.

The desiccant chamber 40 may include a desiccant material. A variety of desiccant materials may be suitable for use in the desiccant chamber 40 to remove substantially all water from the combustion effluent 26. As one general example, the desiccant material may be a molecular sieve material. As one specific example, the desiccant material may be a molecular sieve material with an alkali metal alumino-silicate structure that has an effective pore opening of three angstroms, though any suitable desiccant material may be used.

Thus, the cooling subsystem 14 may receive the combustion effluent 26 and may output a cool, dry gaseous combustion effluent 48.

Referring back to FIG. 1, the cool, dry combustion effluent 48 may be supplied to the first separation subsystem 16. The first separation subsystem 16 may separate a first quantity of carbon dioxide (stream 50) from the cool, dry combustion effluent 48 and may output a lean combustion effluent 52 (i.e., a combustion effluent with less carbon dioxide than originally contained in the combustion effluent). The first carbon dioxide stream 50 may be sent to the collection subsystem 20 by way of fluid line 54.

The first separation subsystem 16 may employ various techniques to separate carbon dioxide from the cool, dry combustion effluent 48. The type of separation technique used by the first separation subsystem 16 may be dictated by various factors, including process conditions (e.g., desired purities of the collected carbon dioxide 50) and process economics (e.g., total energy consumption of the first separation subsystem 16).

While a physisorption process is described below, other techniques, such as chemisorption, vortex separation and liquefaction, may be used by the first separation subsystem 16 without departing from the scope of the present disclosure.

Vortex separation may employ vortex flow to effect separation of the carbon dioxide from the cool, dry combustion effluent 48. For example, the cool, dry combustion effluent 48 may be pumped into a static vortex separator such that a vortex flow path is induced, thereby causing separation of the carbon dioxide, which may have a higher molecular weight than the other constituents of the cool, dry combustion effluent 48.

Liquefaction may employ a pressure vessel and a pump, wherein the pump pumps the cool, dry combustion effluent 48 into the pressure vessel at a pressure sufficient to separate the cool, dry combustion effluent 48 into a liquid fraction and a gaseous fraction. The liquid fraction, which may comprise carbon dioxide, may then easily be separated from the gaseous fraction.

Figure 3:
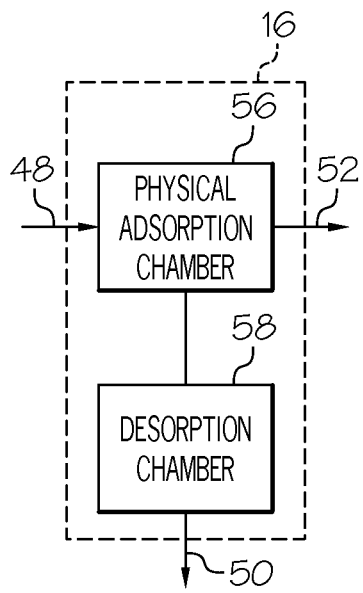
FIG. 3 is a schematic block diagram of the first separation subsystem of the system of FIG. 1.

Referring to FIG. 3, in one particular construction, the first separation subsystem 16 may include a physical adsorption chamber 56 and an optional vacuum desorption chamber 58. Use of additional apparatus and components is also contemplated.

The physical adsorption chamber 56 may receive the cool, dry combustion effluent 48, may contact the cool, dry combustion effluent 48 with an adsorbent material, and may output a carbon dioxide-lean gaseous combustion effluent 52. Therefore, within the physical adsorption chamber 56, carbon dioxide in the cool, dry combustion effluent 48 may be adsorbed onto the adsorbent material by way of a physical adsorption process (physisorption).

Without being limited to any particular theory, use of a physical adsorption process at the first separation subsystem 16 may be advantageous due to the composition of the cool, dry combustion effluent 48. For example, when the process gas 22 is natural gas or the like, the cool, dry combustion effluent 48 may include at least about 10 percent by weight carbon dioxide and at most about 1 percent by weight water. Therefore, the composition of the cool, dry combustion effluent 48 may be ideal for physical adsorption, which may be most efficiently performed at carbon dioxide to water ratios of at least about 1:1.

Various adsorbent materials may be suitable for use in the physical adsorption chamber 56 to adsorb carbon dioxide from the cool, dry combustion effluent 48. As one general example, the adsorbent material may be a molecular sieve material, such as a molecular sieve material having a 10 angstrom effective pore opening size. As one specific example, the adsorbent material may be a zeolite material, such as a zeolite 13X molecular sieve material with a ten angstrom effective pore opening size. As another specific example, the adsorbent material may be a 5A zeolite material.

When a sufficient amount of carbon dioxide has been adsorbed onto the adsorbent material within the physical adsorption chamber 56, the adsorbed carbon dioxide may be released as the first carbon dioxide stream 50, thereby regenerating the adsorbent material. For example, when the concentration of carbon dioxide in the lean combustion effluent 52 exceeds a pre-determined threshold value (e.g., 2 percent by weight, 3 percent by weight, or 5 percent by weight), the adsorbed carbon dioxide may be released to regenerate the adsorbent material.

Various techniques may be used to release the adsorbed carbon dioxide from the adsorbent material in the physical adsorption chamber 56. As one example, the vacuum desorption chamber 58 (which may be the same as, or separate from, the physical adsorption chamber 56) may be used to desorb the carbon dioxide from the adsorbent material. A vacuum may be drawn in the vacuum desorption chamber 58 (or the physical adsorption chamber 56). Therefore, when the adsorbent material is ready to be regenerated, the physical adsorption chamber 56 may be sealed, and the vacuum may be drawn in the desorption chamber 58 (or the physical adsorption chamber 56), thereby drawing the carbon dioxide from the adsorbent material. A cold finger may be positioned downstream of the desorption chamber 58 (or the physical adsorption chamber 56) such that the desorbed carbon dioxide condenses on the cold finger. As one alternative to a cold finger, compression may be used to separate the desorbed carbon dioxide.

As another example, heating, such as with microwave energy, infrared energy or the like, may be used to release the adsorbed carbon dioxide from the adsorbent material in the physical adsorption chamber 56.

Thus, the first separation subsystem 16 may receive the cool, dry combustion effluent 48 and may output a lean combustion effluent 52. The lean combustion effluent 52 may comprise at most about 5 percent by weight carbon dioxide, such as at most about 2 percent by weight carbon dioxide.

Referring back to FIG. 1, the lean combustion effluent 52 from the first separation subsystem 16 may be supplied in series to the second separation subsystem 18. The second separation subsystem 18 may separate a second quantity of carbon dioxide (stream 60) from the lean combustion effluent 52 and may output a substantially carbon dioxide-free exhaust 62 by way of fluid line 63. The second carbon dioxide stream 60 may be sent to the collection subsystem 20 by way of fluid line 64.

Optionally, an air moving unit 34, such as a fan or blower, may introduce ambient air 28 to the lean combustion effluent 52 prior to the second separation subsystem 18 (or within the second separation subsystem 18). The introduction of ambient air 28 to the lean combustion effluent 52 may further cool the lean combustion effluent 52. Additionally, the introduction of ambient air 28 to the lean combustion effluent 52 may introduce natural humidity (water) to the lean combustion effluent 52, which may be advantageous when the second separation subsystem 18 employs a chemisorption process.

Since ambient air 28 includes only about 400 ppm carbon dioxide, introducing ambient air 28 to the lean combustion effluent 52 may dilute the carbon dioxide content of the lean combustion effluent 52. In one expression, the amount of ambient air 28 introduced to the lean combustion effluent 52 may be controlled such that the concentration of carbon dioxide within the lean combustion effluent 52 entering the second separation subsystem 18 does not drop below about 2 percent by weight. In another expression, the amount of ambient air 28 introduced to the lean combustion effluent 52 may be controlled such that the concentration of carbon dioxide within the lean combustion effluent 52 entering the second separation subsystem 18 does not drop below about 1 percent by weight. In yet another expression, the amount of ambient air 28 introduced to the lean combustion effluent 52 may be controlled such that the concentration of carbon dioxide within the lean combustion effluent 52 entering the second separation subsystem 18 does not drop below about 0.5 percent by weight.

The second separation subsystem 18 may employ various techniques to separate carbon dioxide from the lean combustion effluent 52. The type of separation technique used by the second separation subsystem 18 may be dictated by various factors, including the concentration of carbon dioxide in the lean combustion effluent 52, process conditions (e.g., desired purities of the collected carbon dioxide 60) and process economics (e.g., total energy consumption of the second separation subsystem 18).

While a chemisorption process is described below, other techniques, such as physisorption, vortex separation and liquefaction, may be used by the second separation subsystem 18 without departing from the scope of the present disclosure.

Figure 4:
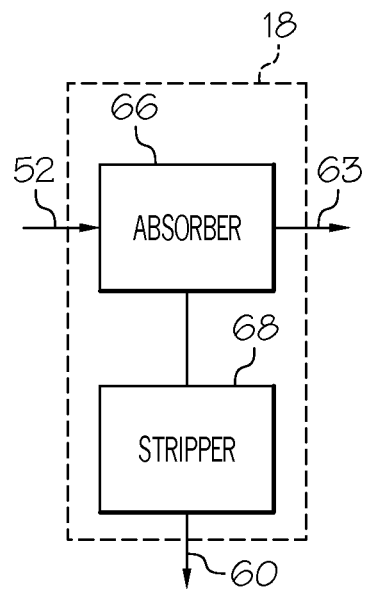
FIG. 4 is a schematic block diagram of the second separation subsystem of the system of FIG. 1.

Referring to FIG. 4, in one particular construction, the second separation subsystem 18 may include an absorber 66 and a stripper 68. Use of additional apparatus and components is also contemplated.

The absorber 66 may receive the lean combustion effluent 52, may contact the lean combustion effluent 52 with a chemical sorbent, and may output the substantially carbon dioxide-free exhaust 62 (FIG. 1) by way of fluid line 63. Therefore, within the absorber 66, carbon dioxide in the lean combustion effluent 52 may be captured by the chemical sorbent by way of a chemical adsorption process (chemisorption).

Without being limited to any particular theory, use of a chemical adsorption process at the second separation subsystem 18 may be advantageous due to the low carbon dioxide concentration of the lean combustion effluent 52, as well as the potential presence of water in the lean combustion effluent 52 due the natural humidity in the ambient air 28.

Various chemical sorbents may be suitable for use in the absorber 66 to extract carbon dioxide from the lean combustion effluent 52. As one general example, the chemical sorbent may be (or may include) an amine. As one specific example, the chemical sorbent may be (or may include) an alkanolamine, such as monoethanolamine, diethanolamine, methyldiethanolamine, diisopropanolamine, diglycolamine, triethanolamine, and combinations thereof. As another general example, a bicarbonate-based chemical adsorption scheme may be used. Various factors, such as the concentration of carbon dioxide in the lean combustion effluent 52 and the composition of the lean combustion effluent 52, may be taken into consideration when selecting the chemical sorbent to be used in the absorber 66.

The carbon dioxide-containing chemical sorbent (e.g., an amine and carbon dioxide solution) may be regenerated in the stripper 68, thereby releasing the second carbon dioxide stream 60. Various techniques may be used to regenerate the chemical sorbent and release the carbon dioxide 60. As one example, the carbon dioxide-containing chemical sorbent may be pumped into the stripper 68, where it may be heated to drive off the carbon dioxide. The thermal energy 42 collected at the cooling subsystem 14 may be used to heat the stripper 68, though additional heating may also be required. The regenerated chemical sorbent may be pumped back to the absorber 66.

Referring back to FIG. 1, the collection subsystem 20 may receive the first carbon dioxide stream 50 from the first separation subsystem 16 (by way of fluid line 54) and the second carbon dioxide stream 60 from the second separation subsystem 18 (by way of fluid line 64), and may optionally combine the dual carbon dioxide streams 50, 60. If necessary, the collection subsystem 20 may further purify the dual (or combined) carbon dioxide streams 50, 60, such as by compression (liquefaction) or heat (distillation).

Additionally, the collection subsystem 20 may transport the dual (or combined) carbon dioxide streams 50, 60 in various ways. As one example, the collection subsystem 20 may pump the dual (or combined) carbon dioxide streams 50, 60 into a holding vessel (e.g., a storage tank). As another example, the collection subsystem 20 may pump the dual (or combined) carbon dioxide streams 50, 60 to a downstream application, such as an injection well at an enhanced oil recovery site. As yet another example, the collection subsystem 20 may pump the dual (or combined) carbon dioxide streams 50, 60 through a pipeline.

Thus, the carbon dioxide 50, 60 received by the collection subsystem 20 may provide another income source of the disclosed system 10.

Accordingly, the disclosed system 10 may use a hydrocarbon-containing process gas 22 to produce multiple sources of potential income: electrical energy, carbon dioxide and water. Furthermore, the disclosed system 10 may be used to produce carbon dioxide 32 at any source 20 of hydrocarbon-containing process gas 22 (e.g., methane), thereby functioning as a virtual pipeline that eliminates the need for long distance transport of carbon dioxide, such as by freight or physical pipeline. For example, the system 10 may be mounted on a mobile platform, such as a truck bed, thereby rendering the system 10 mobile and capable of being implemented where needed.

Figure 5:
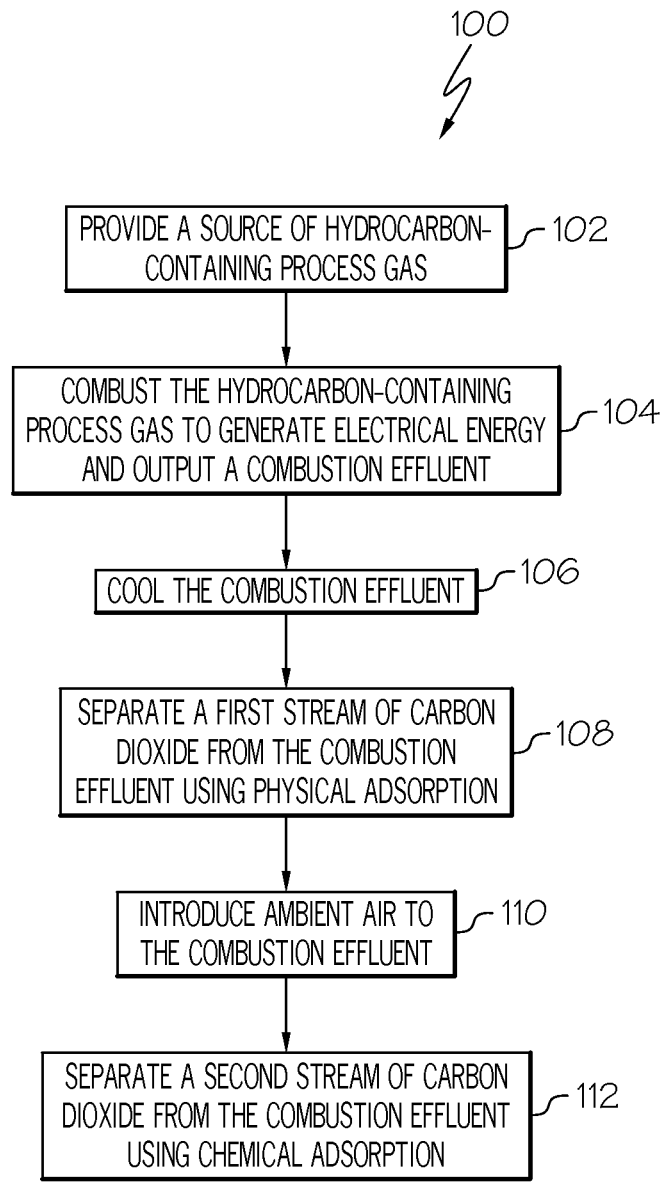
FIG. 5 is a flow chart depicting one embodiment of the disclosed dual stream method for producing carbon dioxide.

Referring to FIG. 5, also disclosed is a dual stream method 100 for producing carbon dioxide. The method 100 may begin at Block 102 with the step of providing a source of hydrocarbon-containing process gas.

At Block 104, the hydrocarbon-containing process gas may be combusted to generate a combustion effluent and electrical energy. Combustion may occur in the presence of oxygen, such as by mixing ambient air with the hydrocarbon-containing process gas. The combustion step may convert most (if not all) of the hydrocarbon in the hydrocarbon-containing process gas into carbon dioxide and water.

Optionally, at Block 106, the combustion effluent may be cooled and/or dehumidified prior to proceeding to Block 108.

At Block 108, a first stream of carbon dioxide may be separated from the combustion effluent. Separation may be effected using a physisorption process (e.g., with a zeolite), though various alternative separation techniques may be used without departing from the scope of the present disclosure. The first stream of carbon dioxide may be collected by a collection subsystem.

Optionally, at Block 110, ambient air may be mixed with the combustion effluent prior to proceeding to Block 112.

At Block 112, a second stream of carbon dioxide may be separated from the combustion effluent. Separation may be effected using a chemisorption process (e.g., with an amine-type chemical sorbent), though various alternative separation techniques may be used without departing from the scope of the present disclosure. The second stream of carbon dioxide may be collected by the collection subsystem and, optionally, may be combined with the first stream of carbon dioxide.

The exhaust from the second separation step (Block 112) may be substantially free of carbon dioxide, and may be released to the atmosphere.

Accordingly, the disclosed method 100 may produce carbon dioxide (as well as water and electrical energy) at any source of hydrocarbon-containing process gas, thereby reducing or eliminating the costs associated with transporting carbon dioxide.

Although various embodiments of the disclosed dual stream system and method for producing carbon dioxide have been shown and described, modifications may occur to those skilled in the art upon reading the specification. The present application includes such modifications and is limited only by the scope of the claims.

What is claimed is:

1. A system for producing carbon dioxide from a process gas, said process gas comprising a hydrocarbon, said system comprising:
    a combustion subsystem configured to combust said hydrocarbon and output a combustion effluent, wherein said combustion effluent comprises carbon dioxide and water;
    a first separation subsystem employing physisorption to separate a first quantity of said carbon dioxide from said combustion effluent; and
    a second separation subsystem in series with said first separation subsystem and downstream of said first separation subsystem, said second separation subsystem employing chemisorption to separate a second quantity of said carbon dioxide from said combustion effluent.

2. The system of claim 1 wherein said hydrocarbon comprises at least one of methane, ethane, propane, and butane.

3. The system of claim 1 wherein said process gas is natural gas.

4. The system of claim 1 wherein said process gas further comprises carbon dioxide.

5. The system of claim 1 wherein said combustion subsystem comprises at least one of an internal combustion engine, a diesel engine modified to run on said hydrocarbon, and a turbine.

6. The system of claim 1 wherein said combustion effluent further comprises at least one of nitrogen and oxygen.

7. The system of claim 1 wherein said combustion effluent comprises at least about 5 percent by weight of said carbon dioxide.

8. The system of claim 1 wherein said combustion effluent is substantially free of said hydrocarbon.

9. The system of claim 1 wherein said combustion subsystem generates electrical energy.

10. The system of claim 1 further comprising a cooling subsystem interposed between said combustion subsystem and said first separation subsystem.

11. The system of claim 10 wherein said cooling subsystem comprises a heat exchanger thermally coupled with at least one of said first separation subsystem and said second separation subsystem.

12. The system of claim 10 wherein said cooling subsystem comprises a desiccant.

13. The system of claim 1 wherein said first separation subsystem comprises a zeolite.

14. The system of claim 1 further comprising an air moving unit configured to introduce ambient air to said combustion effluent.

15. The system of claim 14 wherein said ambient air is introduced between said first separation subsystem and said second separation subsystem.

16. The system of claim 1 wherein said combustion subsystem, said first separation subsystem and said second separation subsystem are on a mobile platform.

17. A system for producing carbon dioxide from a process gas, said process gas comprising a hydrocarbon, said system comprising:
    a combustion subsystem configured to combust said hydrocarbon and output a combustion effluent, wherein said combustion effluent comprises carbon dioxide and water;
    a first separation subsystem configured to separate a first quantity of said carbon dioxide from said combustion effluent; and
    a second separation subsystem configured to separate a second quantity of said carbon dioxide from said combustion effluent,
    wherein ambient air is introduced between said first separation subsystem and said second separation subsystem.

18. The system of claim 17 wherein said second separation subsystem is in series with said first separation subsystem and downstream of said first separation subsystem.

19. The system of claim 18 wherein said first separation subsystem comprises an adsorbent material.

20. The system of claim 19 wherein said second separation subsystem comprises a chemical sorbent.

* * * * *